United States Patent [19]
Rusnak

[11] Patent Number: 4,700,425
[45] Date of Patent: Oct. 20, 1987

[54] WIPER ELEMENT AND HOLDER

[76] Inventor: Mark A. Rusnak, 39 Buchanan Dr., Virginia Beach, Va. 23456

[21] Appl. No.: 820,360

[22] Filed: Jan. 21, 1986

[51] Int. Cl.$^4$ .............................................. B60S 1/38
[52] U.S. Cl. .................................................... 15/250.41
[58] Field of Search ............ 15/250.36, 250.40, 250.41, 15/250.42

[56] References Cited

U.S. PATENT DOCUMENTS

| | | |
|---|---|---|
| 1,699,634 | 1/1929 | Smulski . |
| 2,289,545 | 7/1942 | Horton et al. . |
| 2,949,651 | 8/1960 | Hill ............................ 15/250.41 X |
| 3,056,991 | 10/1962 | Smithers . |
| 3,224,027 | 12/1965 | Oishei et al. ....................... 15/250.41 |
| 3,414,930 | 12/1968 | Kodama . |
| 4,192,038 | 3/1980 | Klein et al. . |
| 4,327,457 | 5/1982 | Lunsford . |
| 4,442,566 | 4/1984 | Sharp ............................. 15/250.42 |

FOREIGN PATENT DOCUMENTS

| | | | |
|---|---|---|---|
| 109121 | 11/1939 | Australia ........................ 15/250.41 |
| 2705700 | 8/1978 | Fed. Rep. of Germany ... 15/250.41 |
| 2736767 | 2/1979 | Fed. Rep. of Germany ... 15/250.41 |

Primary Examiner—Peter Feldman
Attorney, Agent, or Firm—Pennie & Edmonds

[57] ABSTRACT

A wiper element includes a member formed of a flexible, resilient material and comprised of a body portion having a strip at one side and a pair of wiper blades extending from the opposite side in parallel, spaced relation. The strip is spaced from the body portion by the length of a connecting neck forming a gap, and the body portion is formed to provide at least one extension from each side adjacent the strip and wiper blades. The wiper blades are partially formed by an inwardly arcuate contour extending from a location of each extension to a blunt end. The body portion is capable of flexing about the gap so that the blunt end of each wiper blade contacts a window during a wiping action.

A holder is adapted to be supported by a wiper arm and, in turn, supports the strip of the wiper element.

12 Claims, 15 Drawing Figures

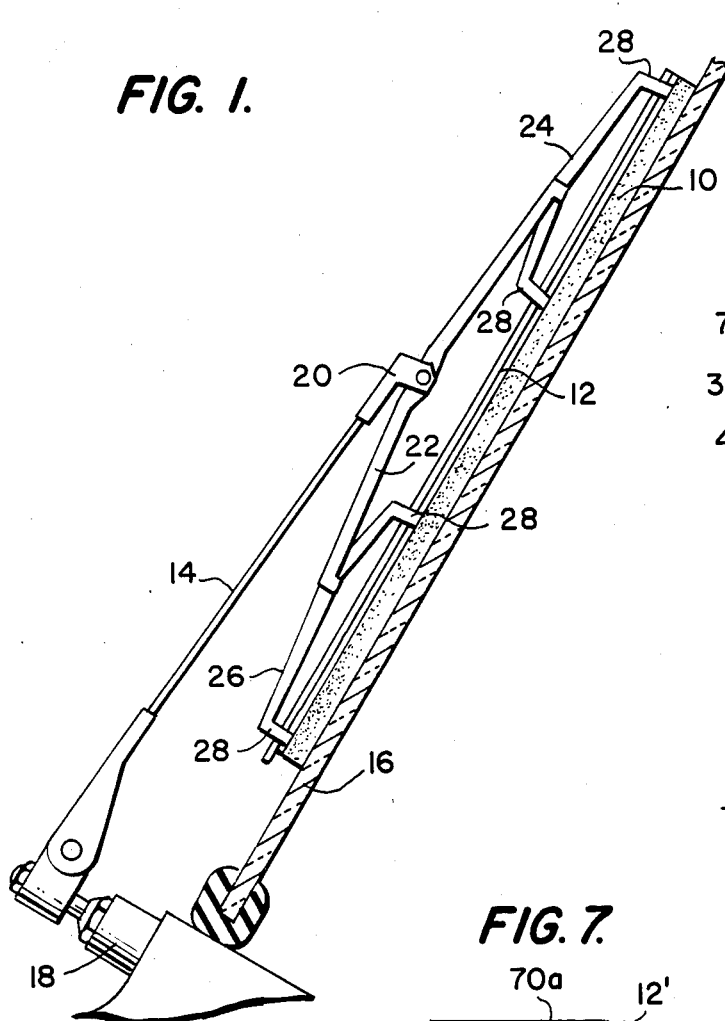
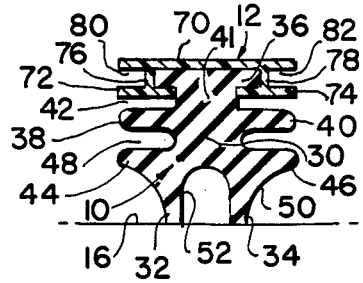
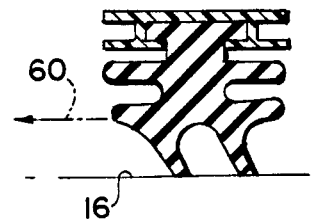
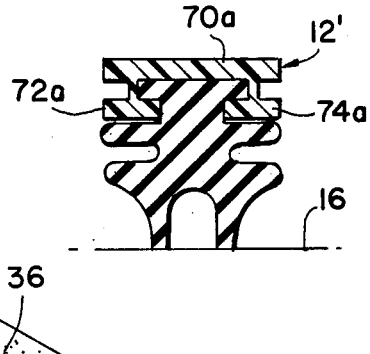
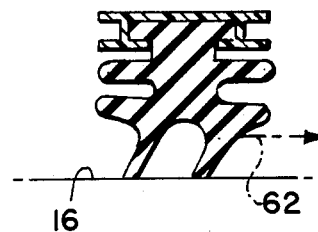
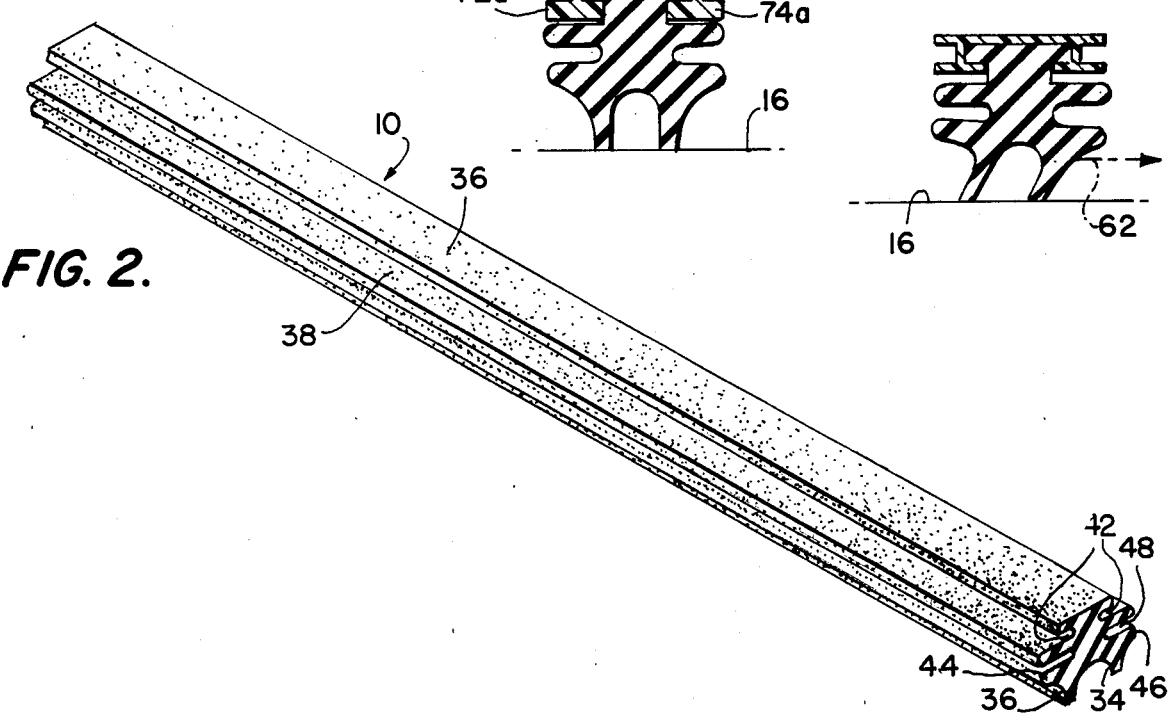

WIPER ELEMENT AND HOLDER

DESCRIPTION

1. Technical Field

The invention is in a wiper element having at least two wiping blades which constantly contact a window, such as a windshield, or rear window of a vehicle, and the combination of a wiper element and holder.

2. Background of the Invention

Wiper elements adapted to be mounted on a wiper arm in position for wiping a window, such as a windshield have been known for many, many years; and the wiper elements, during this period of time have taken many forms. Included in the prior art are the forms of wiper element having a pair of wiper blades providing a dual wiping action. Representative of this part of the prior art are the wiper elements disclosed in U.S. Pat. Nos. 1,699,634 to Smulski, 2,289,545 to Horton et al, 3,056,991 to Smithers, 4,192,038 to Klein et al and 4,327,457 to Lunsford. Referring to Smulski, there is a disclosure of a wiper element comprised of a body in the form of a hollow member adapted to be either pressurized or filled with yieldable material, including a pair of blades extending from the body to contact a window. Horton et al disclose a wiper element comprised of a core and a channeled holder received thereon. The core, in section, and along its length, is generally of tear drop outline, while the holder is substantially of U-shaped outline. The blades are comprised of a laminated sheet member including two lamina, one with a roughened surface and one with a smooth surface. The member extends beyond the tip of the core on both sides. The member is secured between the core and holder. Smithers discloses a wiper element comprised of a body and a pair of blades extending from the body. The body is somewhat flattened across its width and the blades are both connected and extend from the sides of the body. The connection is at a neck down portion of the body. The Klein et al and Lunsford disclosures are somewhat similar. Each patent discloses a wiper element including a body for supporting a reservoir providing a source of a fluid and a pair of blades extending from the body on opposite sides of the reservoir.

A further wiper element of the prior art is disclosed in U.S. Pat. No. 3,414,930 to Kodama. Kodama discloses various constructions of wiper element including a body and a single blade extending from the body.

SUMMARY OF THE INVENTION

The invention is in a wiper element which is an improvement in wiper elements of the prior art, and the combination of an improved wiper element and holder. According to the invention the wiper element is formed of a resilient, flexible material and serves the function of wiping a window, such as the windshield or rear window of a vehicle. The wiper element is comprised of a unitary elongated member including a body portion and a strip, together with a neck connecting the strip to one side of the body portion. The neck is of a length to provide a gap between the strip and body portion. The gap is of a width to receive a holder for supporting the wiper element on a wiper arm. The holder may be of a thickness substantially equal to the width of the gap or of a thickness less than the width of the gap. The latter construction may permit a somewhat greater freedom of movement of the body portion about the neck during a wiping operation. In both cases, however, the make up of the wiper element permits sufficient freedom of movement thereby to provide the wiping action, to be described.

A pair of wiper blades extend from the body portion, opposite the strip. The wiper blades are spaced apart in a substantially parallel disposition and extend throughout a substantially equal length to a blunt, wiping end. The body portion is formed to provide at least an extension from each side adjacent the blades and strip, and each extension adjacent the blades, at an outer location, merges with a respective wiper blade along an inwardly arcuate surface.

Several forms of the wiper element will be discussed as the description continues. In each form, at least the two wiper blades will provide a wiping action, and depending upon features which include at least those of the flexibility of material, length of wiper blades and the contour from the extension, it may be possible to provide a wiping action with both blades and an outer location of an extension.

Other features of the invention will become apparent as the description to be read in conjunction with a consideration of the drawings continues.

BRIEF DESCRIPTION OF THE DRAWINGS

FIG. 1 is an elevational view of a wiper assembly including a wiper element and holder, attached to a wiper arm in an operative position of use in wiping a window;

FIG. 2 is a perspective view of the wiper element with the holder removed;

FIGS. 3A, 3B, and 3C are views in section illustrating, respectively, the wiper element and holder in a position of repose, and positions during a wiping action to the left and right (the directions of the arrows);

FIG. 7 is a view like that of FIG. 3A illustrating the wiper element and holder of slightly modified construction in a position of repose.

BEST MODE FOR CARRYING OUT THE INVENTION

Figure 4A:
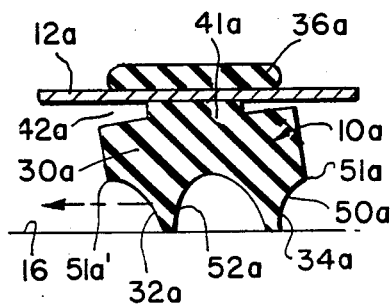
FIG. 4A, 4B and 4C are views similar to FIG. 3, illustrating a second form of wiper element and holder.

Referring to FIG. 1, there is an environmental view of a wiper assembly including a wiper element 10 and holder 12. The wiper assembly is mounted by a wiper arm 14 in position to wipe a window 16, such as the windshield or rear window of a vehicle. The wiper arm typically may be imparted the characteristic of springiness so that its outer end is urged under pressure toward the window. One end of the wiper arm may be connected to the drive of a motor 18 providing an alternating back and forth movement to the arm and wiper assembly. A connecting means in the form of a fitting 20 is supported at the other end of the wiper arm 14 for connecting the wiper arm to a load distribution bar 22. The load distribution bar, in turn, supports a pair of auxiliary bars 24, 26, each including a pair of gripping members 28 at their outer extremes. The gripping members comprise inwardly directed fingers to mount the wiper assembly, and FIG. 1 illustrates one of a host of different structures providing a connection for mounting a wiper assembly to a wiper arm.

A first form of wiper element 10 of the wiper assembly may be seen perhaps to best advantage in FIG. 2, and in FIGS. 3 (A, B and C) illustrating several possible positions of the wiper element including a position of repose and two operative positions during movement of the wiper blade across the window 16.

Wiper element 10 is made of a strong, flexible, and resilient material, such as synthetic rubber, a block silicone or the equivalent, and fabricated by any suitable manufacturing technique, such as extrusion. The wiper element, within the context of this disclosure, may be made in various lengths and thicknesses and is substantially symmetrical about a longitudinal axis.

Referring to FIGS. 2 and 3, it will be seen that the wiper element 10 is of unitary construction including a body 30, a pair of wiper blades 32, 34 extending from the lower portion of the body to a blunt, wiping end, a strip 36 extending along the upper portion of the body, opposite the blades, and a pair of extensions 38, 40. The extensions extend in opposite directions laterally outwardly of the body. The strip extends in the same direction as extensions 38, 40 and is spaced from the extensions by a neck 41 forming a gap 42 on each side of the body. The strip, however, is somewhat reduced in width from that of the extensions. A second pair of extensions 44, 46 coextensive with extensions 38, 40 is spaced from the extensions by a gap 48. The gap 48 is substantially equal in width to the width of gap 42.

The second pair of extensions 44, 46 comprises the upper portion of the blades 32, 34, respectively. Thus, the blades are particularly described by an outer, inwardly arcuate surface 50 connecting between an outer edge of each blade and the end or outer location of an extension, and an inner arcuate surface 52 connecting between an inner edge of each blade. The arcuate surfaces provide the blades with a tapered contour extending toward a blunt, wiping tip. Each blade 32, 34 may extend from body 30 throughout an appropriate length dimension so that they are capable of flexing during a wiping movement when the wiper assembly moves back and forth in the direction of arrows 60, 62 (see FIGS. 3B, 3C). Cleaning efficiency is dependent during alternating back and forth movements of the wiper element at least upon action against the glass of the outer edge of one wiper blade and the inner edge of the other wiper blade and vice versa.

As may be seen in FIGS. 3B and 3C, both of the blades 32, 34 flex about the lower portion of body 30. A maximum flex is determined, in part, by the width of gap 48 and the amount of movement of an end of either extension 44, 46 into contact with the region of the end of 38, 40, respectively. Flex is also determined by the contour of the surfaces 50, 52, the length of the blades 32, 34, the material of the wiper element and the amount of movement of the extensions 38, 40 may undergo toward the base of a holder, such as the holder of FIGS. 3 and 5–7. The wiping action of wiper element 10 upon the window 16 is provided by the tips of blades 32, 34 and a lower portion of the arcuate surfaces 50, 52 adjacent the tips. However, as discussed, there may be circumstances that the wiper blade may provide a wiping action by the additional contact against the window of one or the other of extensions 44, 46.

The holder 12 comprises a body formed of substantially any material capable of supporting the wiper element 10. For example, the holder may be formed of plastic including one of the structural plastics, or metal, each of which will display the support capability and a capability of flex longitudinally thereby to permit the wiper blade to conform to a window that may be somewhat curved.

Referring to FIGS. 3 (A, B and C) the holder 12 includes an upper base 70 and a lower base, parallel to the upper base, formed by a pair of restraining members 72, 74. The restraining members 72, 74 are interconnected to the upper base 70 by a pair of webs 76, 78, respectively. The webs are spaced apart and together with the upper base and restraining members form an elongated channel into which strip 36 of the wiper blade is received and secured. As may be apparent, the length of each web and the spacing between webs will be greater than the width and length of the strip to allow passage of the strip into the channel. The length of each web and the spacing of the webs, however, will not be so great as to militate against the provision of an adequate support surface the strip in mounting the wiper element to the holder. As may also be apparent, the spacing between restraining members will be sufficient to allow passage of neck 41 which supports the strip as the strip is received into the channel. The holder will be of a length to extend beyond the ends of the wiper element, and a projection, such as a button or the equivalent (not shown) may be located at the ends of the holder to extend toward the channel. The projections engage opposite ends of the wiper element, within the region of the strip, to mechanically secure the wiper element in position.

Both the upper base 70 and the restraining members 72, 74 extend beyond webs 76, 78 to form a channel 80, 82. The gripping members 28 may be received in the channels 80, 82 to mount the wiper assembly on wiper arm 14. While not shown a spring lock, as may be conventional, is received on and secured at the ends of the holder 12. The spring lock includes a pair of spring fingers which extend along the holder juxtaposed to the upper surface of base 70. These fingers are biased together by the fingers of the gripping members when received into a channel 80, 82, and the spring fingers, then, spring outwardly to grip the fingers of gripping members 28.

A second form of holder 12a is illustrated in FIGS. 4 (A, B and C). The holder generally includes an elongated, planar body having a length slightly longer than the length of the wiper element it supports. The body includes a rectangular cut out (not shown) having a length substantially coextensive with the length of wiper element 10 and a width substantially equal to that of the thickness of neck 41 of body 30. The natural resiliency of the material of the wiper element permits the strip 36 to pass through the cutout in the support of the wiper element on the holder 12a.

The holder 12a may be formed of the same materials as holder 12 and mounted to the wiper element in a substantially similar manner. While holder 12a is illustrated in the Figures as a mounting instrumentality for the wiper elements of FIGS. 4–6, the wiper element of those Figures and the wiper element of FIG. 3 may be mounted by either of the holders. A spring lock (not shown) which is somewhat similar to the spring lock previously discussed is used to secure the wiper assembly including the wiper element and holder 12a to wiper arm 14. To this end, a spring lock, likewise including a pair of fingers is mounted on the holder to extend along the gap 42a (or 42b or 42c). Each finger may include a projection extending toward the other finger to engage against the neck 41a (or 41b or 41c). The material of the neck maintains the fingers in a spread position, yet the material of the neck may be somewhat deformed by the projections when the fingers are moved together. The fingers will take the latter attitude when the fingers of gripping members 28 are received around the holder to extend into the respective gap. The spring lock will secure the gripping members.

Figure 4B:
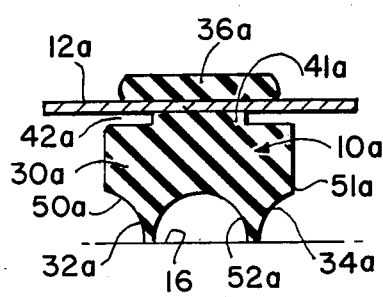
Figure 4C:
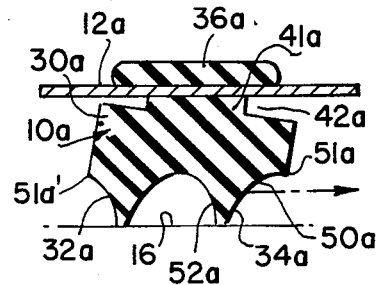
Figure 5A:
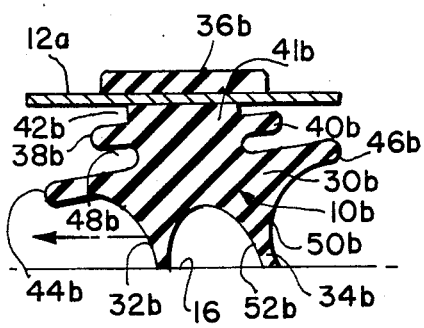
FIGS. 5A, 5B, and 5C are views similar to FIG. 3, illustrating a third form of wiper element holder.
Figure 5B:
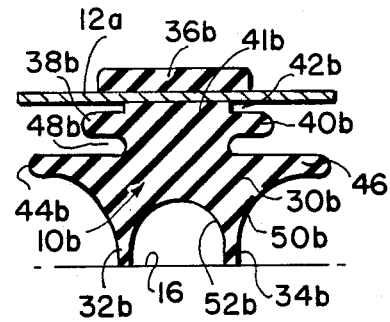
Figure 5C:
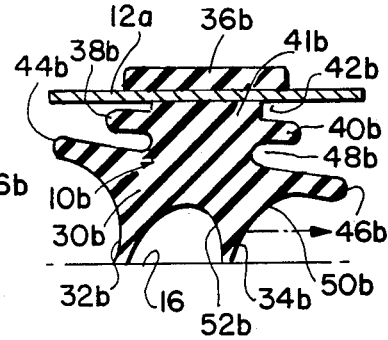
Figure 6A:
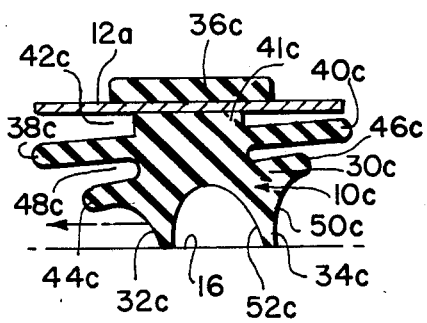
FIGS. 6A, 6B, and 6C are views similar to FIG. 3, illustrating a fourth form of wiper element and holder.
Figure 6B:
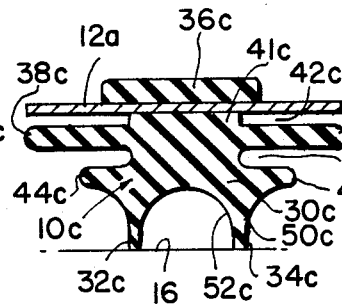
Figure 6C:
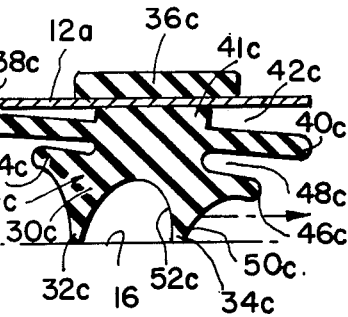

Additional forms of wiper elements are illustrated in FIGS. 4–6 (A, B and C). To this end, the Figures illustrate a wiper elements 10a, 10b and 10c, respectively. Referring to FIG. 4 the wiper element includes a unitary body 30a illustrated in a position of repose (FIG. 4B) and in positions of movement across window 16 to the left (FIG. 4A) and to the right (FIG. 4C). FIGS. 5 and 6 (A, B and C) illustrate further forms of wiper elements in like dispositions.

A pair of wiper blades 32a, 34a (FIG. 4) extend from the lower portion of the body and a strip 36a is juxtaposed to the upper portion of the body opposite the blades. This arrangemnt of structure generally duplicates the arrangements of structure and FIGS. 2 and 3. The body is enlarged within the central region and a neck 41a supports the strip 36a on the body. Thus, the strip is spaced from the body by the width of a gap 42a on each side of the neck. The strip has a width somewhat reduced in dimension from that of the width of the enlarged central region, although larger in dimension than that of the neck connecting the enlarged central region and strip. In this form of the invention, the body 30a generally defines an extension like the extensions 38, 40.

The enlarged central region of body 30a comprises the upper portion of wiper blades 32a, 34a which are particularly described by an outer, inwardly arcuate surface 50a connecting between the end of each blade and an edge 51a' of the central region, and an inner arcuate surface 52a likewise connecting between the ends of each blade. The blades 32a, 34a, as well as the blades of the wiper blade of FIGS. 5 and 6 to be described are both structured and function like the blades of wiper element 10, heretofore described. In the form of wiper element of FIG. 4, the flexibility, of the wiper blades and body may result in an edge 51a or 51a' serving as an additional contact surface against the window.

The wiper elements 10b and 10c of FIGS. 5 and 6 are somewhat similar to one another and the wiper element 10. To this end, the wiper element of FIGS. 5 and 6 are of unitary construction including a body 30b (30c), a pair of wiper blades 32b, 34b (32c, 34c) extending from the lower portion of the body, a strip 36b (36c) juxtaposed the upper portion of the body, opposite the blades, and a pair of extensions 38b, 40b (38c, 40c) which extend in opposite directions outwardly of the body between the upper and lower portions. The strip is spaced from the extensions by a neck 41b (41c) forming a gap 42b (42c) on each side of the body. Again, the strip is somewhat reduced in width from that of the extensions. A second pair of extensions 44b, 46b (44c, 46c) are disposed below and spaced from extensions 38b, 40b (38c, 40c) by a gap 48b (48c) substantially equal in width to that of gap 42b (42c).

Extensions 44b, 46b (44c, 46c), respectively, comprise the upper portion of the blades 32b, 34b and 32c, 34c which are particularly described by outer, arcuate surfaces 50b (50c) connecting between the end of each blade and the end of an extension, and in inner arcuate surface 52b (52c) likewise connecting between the end of each blade.

The wiper elements of FIGS. 3, 5 and 6 differ from one another only in the relative lengths of the extensions, identified in FIG. 3 as extensions 38, 40, 44 and 46 and similarly in the other Figures with a number followed by the appropriate subscript.

FIG. 7 illustrates a holder 12' which is substantially similar to the holder 12 of FIG. 3, except for the structures of the upper base 70a and restraining members 72a, 74a. In FIG. 7 the structure of the restraining members are somewhat thicker than those of FIG. 3 to substantially fill the area of gap 42. In either case, however, the overall make up of the wiper element permits sufficient freedom of movement to provide a dual wipe with blades 32, 34, and it is likely that the wiper element may provide a triple wipe movement, as well.

I claim:

1. A wiper element formed of a resilient, flexible material for wiping a window, such as a windshield or rear window of a vehicle, comprised of an elongated member including a body portion, a strip extending along one side of the body portion, a neck connecting the strip and body portion forming a gap on each side of the neck, a pair of wiper blades extending away from the body portion on the side of the body portion opposite the strip, said blades being spaced apart, in substantially parallel disposition and substantially coextensive in length to a blunt, wiping end, an extension along each side of the body portion adjacent the one side, each extension located adjacent the blades and each extension including an outer location connected with an outer edge of the blunt, wiping end of a wiper blade along a continuous, inwardly arcuate path to define the outer surface of each blade, and an inner edge of the blunt, wiping end of the wiper blades being connected along a continuous arcuate path to define the inner surface of each blade.

2. The wiper element of claim 1 wherein each extension extends beyond the width of the strip.

3. The wiper element of claim 2 wherein a second extension is disposed along each side of the body portion adjacent the one side, each second extension being located adjacent the strip and together with the strip forming the gap, and the extensions on each side of the body being spaced apart to form a second gap.

4. The wiper element of claim 3 wherein the extensions on each side of the body portion are coextensive in length.

5. The wiper element of claim 3 wherein the second extensions located at the first mentioned gap extend from the body portion throughout a distance different from that of the first-mentioned extensions.

6. The wiper element of claim 5 wherein the the first-mentioned extensions located at the first-mentioned gap extend from the body portion throughout a distance greater than second extensions.

7. The wiper element of claim 3 wherein the width of the gaps is equal.

8. The combination of a wiper element of claim 1 and a holder for mounting the wiper element on a wiper arm.

9. The combination of claim 8 wherein the holder includes a base, a pair of restraining members extending toward one another, and a web element supporting each restraining member on the base in spaced relation to define with the respective restraining members and base a channel for receipt of the strip while allowing freedom of movement of the body portion about the neck located between restraining members when the wiper element wipes the window.

10. The combination of claim 8 wherein the holder includes a planar member of a width less than that of the gap and having a cutout substantially equal in length to the length of the wiper element, and equal in width to the width of the neck.

11. The wipe element of claim 1 wherein the strip, blades and extensions extend along the body portion throughout a length substantially equal to the length of the body portion.

12. The wiper element of claim 1 wherein said body portion, strip, extensions and blades are symmetrical about a longitudinal axis.

* * * * *